April 27, 1937.   J. A. JEFFERSON   2,078,384
DELIVERY MANIFOLD FOR TANK VEHICLES
Original Filed July 10, 1934   3 Sheets-Sheet 1
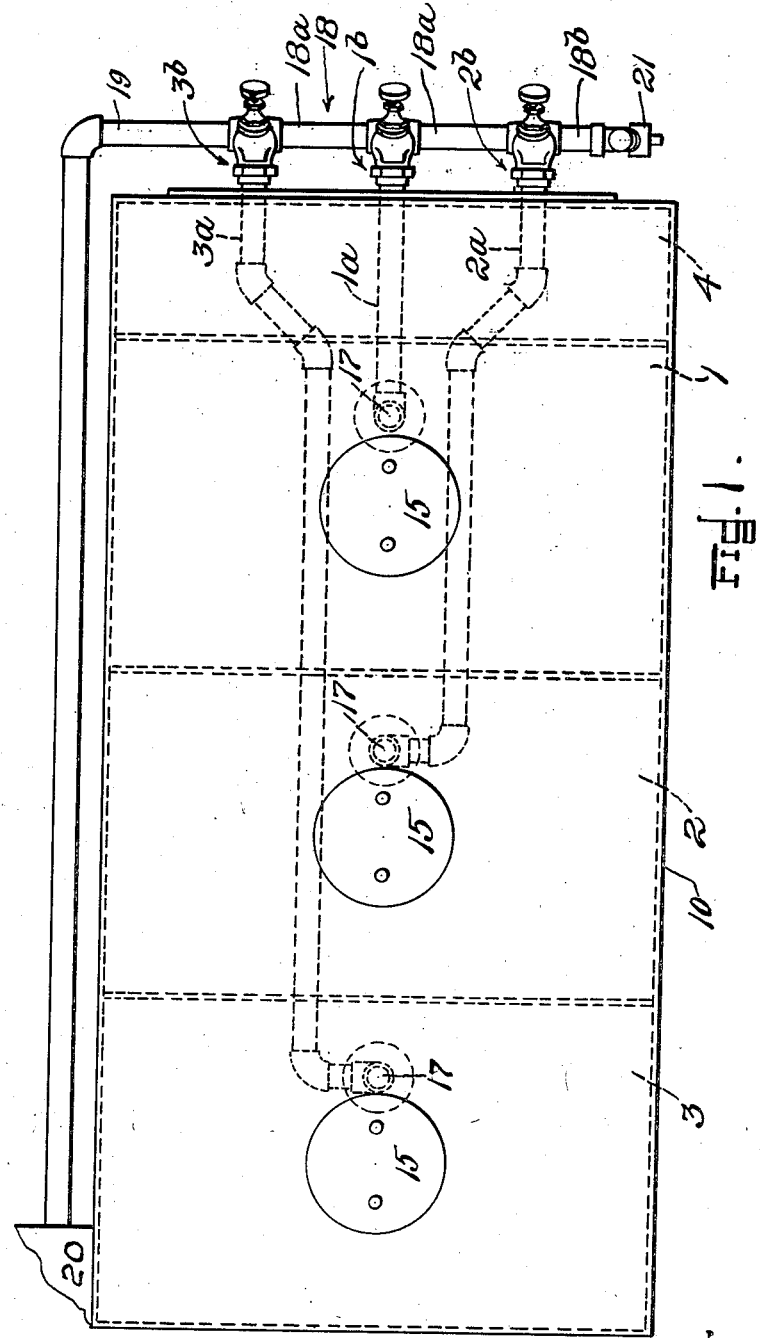

April 27, 1937.   J. A. JEFFERSON   2,078,384
DELIVERY MANIFOLD FOR TANK VEHICLES
Original Filed July 10, 1934   3 Sheets-Sheet 2
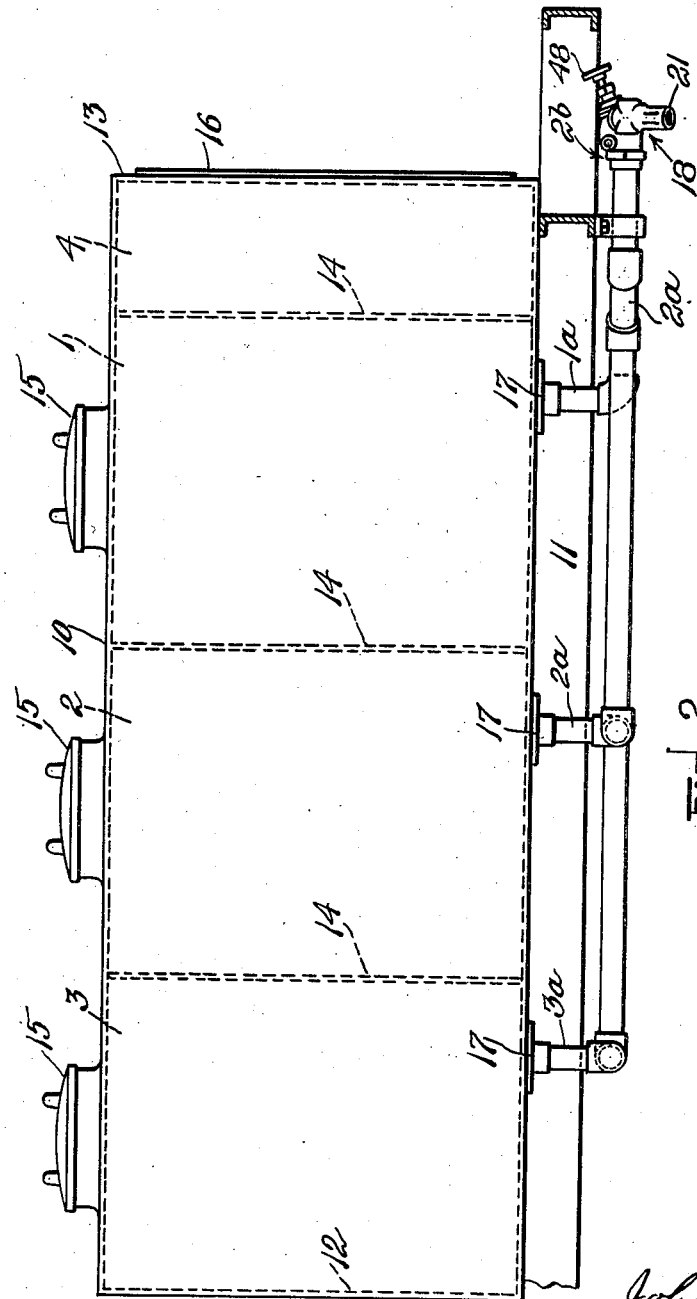

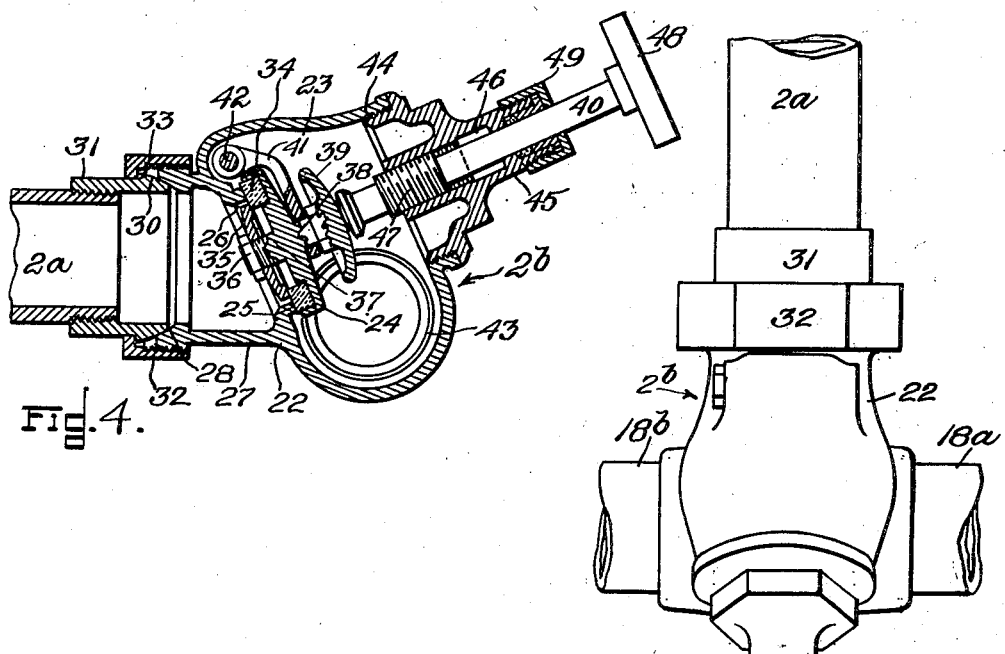
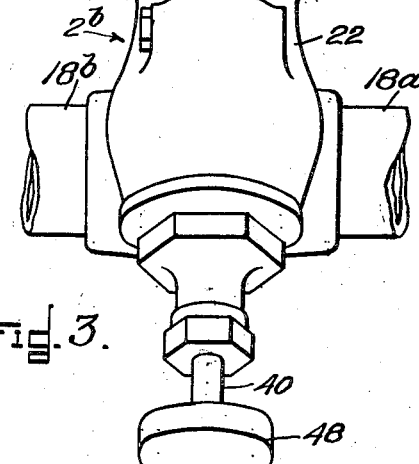
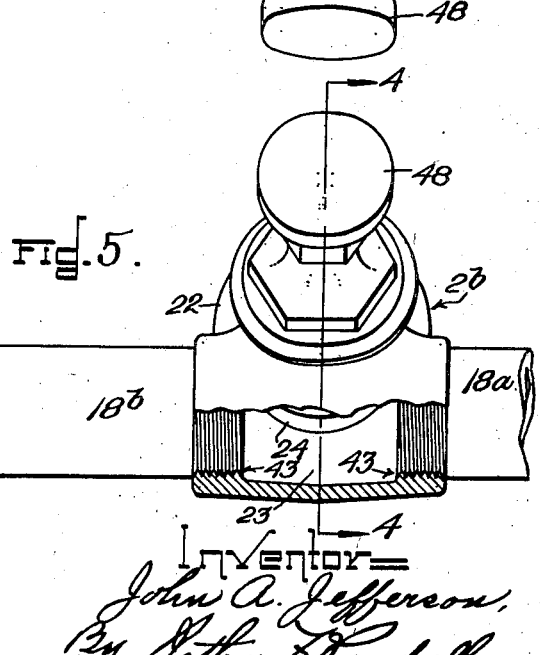

Patented Apr. 27, 1937

2,078,384

UNITED STATES PATENT OFFICE 2,078,384

DELIVERY MANIFOLD FOR TANK VEHICLES

John Andrew Jefferson, Belmont, Mass.

Original application July 10, 1934, Serial No. 734,526. Divided and this application August 8, 1935, Serial No. 35,296

3 Claims. (Cl. 137—21)

My invention relates to tank vehicles and particularly to tank trucks such as are used in transporting and dispensing kerosene, gasolene and other oils, the object of the invention being to provide an improved vehicle of the class indicated.

Vehicles of the class referred to include motor-propelled tank trucks such as are in common use at the present time, each of which is constructed with a body consisting of an elongate horizontal longitudinally disposed sheet metal tank that is interiorly divided into a plurality of liquid-holding compartments by a number of transversely arranged partitions, said compartments being employed to hold different kinds of oils. Each of these compartments is provided at its bottom with an outlet with which is connected a separate delivery pipe conduit extending longitudinally to the rear end of the vehicle. At the rear end of the vehicle the several delivery conduits are connected with a transversely disposed delivery manifold whereof one end is connected by an off-take pipe conduit with the inlet of a motor-driven delivery pump and whereof the opposite end is commonly provided with a normally closed draw-off faucet from which metered deliveries may be made by gravity.

Heretofore, tank trucks of this kind have been constructed with an independent stop valve fitting or unit in each delivery conduit between the compartment thereof and the manifold and with an independent gravity-controlled or flow-controlled check valve fitting or unit in each delivery conduit between said compartment and said stop valve unit. Consequently, the construction was comparatively complicated and expensive and involved an objectionably large number of joints which it was necessary to make and maintain tight against leakage.

The main object of my invention is to improve the construction of the manifolds of tank trucks of this type.

To this end I have provided improved liquid dispensing apparatus for embodiment in trucks of the class described, said apparatus having the peculiar features of construction and operation set forth in the following description, the several novel features of the invention being separately pointed out and defined in the claims at the close thereof.

In the accompanying drawings:—

Figure 1 is a top plan view of the tank of a truck constructed in accordance with my invention.

Figure 2 is a side elevation, partly in section, of the structure illustrated in Fig. 1.

Figure 3 is a top plan view of my new combination check and stop valve fitting.

Figure 4 is a section on line 4—4 of Fig. 5.

Figure 5 is a rear elevation of an end portion of the manifold hereinafter described.

The illustrated embodiment of my invention comprises the sheet metal tank body 10 of a vehicle of the class above referred to, said tank body being mounted as usual upon a channel iron frame 11 which, in turn, may be mounted as usual upon springs, not shown, carried by the chassis of the vehicle. The vehicle may be motor-propelled as usual.

The tank body 10 is made with a front end wall 12, a rear end wall 13, and several intermediate transverse partition walls 14 which divide the interior thereof into three oil-holding compartments 1, 2 and 3 and a storage compartment 4 for holding the usual measuring cans, not shown.

The top of each compartment 1, 2 and 3 is constructed, as usual, with a dome provided with a removable cover or closure 15 while the rear wall 13 is made, as usual, with a doorway provided with a door 16 affording access to the measuring cans, not shown, within compartment 4.

Each compartment 1, 2 and 3 is made at its bottom with an outlet 17, the outlet 17 of compartment 1 being connected with a transversely disposed manifold 18 at the rear end of the vehicle by a delivery pipe conduit 1a; the outlet 17 of compartment 2 being connected with said manifold by a pipe conduit 2a, and the outlet 17 of compartment 3 being connected with said manifold by a pipe conduit 3a.

The manifold 18, as herein constructed, comprises three combination check-and-stop valve fittings 1b, 2b and 3b disposed in spaced apart relationship and connected by two pipe sections 18a. The valve fitting 3b adjacent to one side of the vehicle also has connected with it one end of an off-take pipe conduit 19 whose opposite end is connected with the inlet of the usual motor-driven pump 20, while the valve fitting 2b adjacent to the opposite side of the vehicle is connected by a pipe section 18b with a draw-off faucet 21 from which delivery may be made directly into a measuring can, or through the usual metering hose, not shown, that is attachable to the outlet of said faucet.

The three combination check-and-stop valve units 1b, 2b and 3b are all of like construction and each comprises a hollow "cross" pipe fitting body 22, Figs. 3, 4 and 5, whose interior provides a central valve chamber 23 within which is arranged a check and stop valve element 24 adapted to close against a seat 25 surrounding an inlet port 26. This port 26 extends through an exteriorly threaded nipple 27 that is part of the valve body 22.

The outer end portion of nipple 27 is interiorly formed with a parti-spherical concaved seat 28 for a complemental parti-spherical convex end portion 30 provided upon the exterior of a coupling nipple 31. The nipple extension 27 of the valve body 22 is exteriorly threaded to receive upon it an interiorly threaded ring coupling member 32 which, together with the two nipples 27 and 31 provide a union by means of which the valve fitting is connected with one end of its delivery pipe conduit.

The nipple 31 is interiorly threaded at one end thereof to receive the exteriorly threaded end portion of the delivery pipe conduit, and exteriorly formed with an annular radial shoulder 33 to abut a complemental shoulder provided upon the interior of ring member 32 whereby the latter clamps the end of nipple 31 against the seat 28 on body 22.

The valve 24 is constructed with a circular cup-like body within which is an annulus 34 made from a non-metallic composition, said annulus being provided for engagement with the seat 25 on body 22. This annulus 34 is securely clamped within the cup-shaped body of the check valve by means of a washer 35 and nut 36, the latter being mounted upon a threaded stem 37 projecting from the front side or face of said body.

Projecting from the opposite rear side or face of the cup-shaped body of the valve 24 is another stem 38 provided at its upper end with a flanged head 39 having a convex top side for engagement with the inner end of an adjustable valve-locking member 40.

Between the head 39 and the cup-like body of the valve 24 the stem 38 has loosely mounted thereon one end of a valve-supporting arm 41, said end being formed with an aperture through which the stem 38 extends loosely so that the valve 24 can rock universally to a limited extent relatively to arm 41 and fit itself to the seat 25.

The opposite end of arm 41 is pivotally connected with the fitting body 22 by means of a pintle 42 so that when locking member 40 is disengaged from head 39 the check valve 24 is free to swing toward and from seat 25.

At the opposite sides of the valve chamber 23 the fitting body 22 is made with interiorly threaded ports 43 each adapted to receive within it the exteriorly threaded end of one of the pipe sections 18a and 18b of the manifold, the axes of said ports being relatively alined perpendicularly with respect to the axis of port 26 and off-set downwardly relatively thereto so that the flow of oil from one of said pipe sections through chamber 23 to the other pipe section is not impeded by valve 24.

Upon the side of chamber 23 opposite the port 26 the fitting body 22 is made with a circular interiorly threaded port or aperture 44 into which is screwed the exteriorly threaded skirt of a cap 45 having a centrally disposed hole 46 extending therethrough within which the locking member 40 is rotatably mounted. The locking member 40 is herein shown as a spindle having an intermediate threaded portion 47 in engagement with the interiorly threaded inner end portion of the hole 46 so that when the locking member is rotated in one direction its inner end may be forced against the head 39 of the valve 24 thereby to lock the latter in its closed position, and when rotated in the opposite direction its inner end may be retracted sufficiently to permit the check valve to open and close.

Locking member 40 is manually operated and therefore is provided at its outer end with a hand wheel 48.

Leakage of oil from chamber 23 through the hole 46 is prevented by a stuffing box 49 provided at the outer end of said hole.

It will be clear from the above description that the valves 24 of the delivery pipe conduits 1a, 2a and 3a will function at times as check valves to prevent oil from flowing from one compartment through the manifold into another compartment so that it is impossible for a dishonest operator to deliver short measure to a customer, or for the different oils to be mixed.

In making a delivery the operator unscrews the locking member 40 of the compartment from which it is desired to make the delivery and then when pump 20 is set in operation the oil is moved from said compartment through the off-take conduit 19 and pump 20 to the customer's receiving vessel or container. Or if the delivery is to be made through the usual metering hose, not shown, then the latter is attached to the faucet 21 and when the locking member 40 of the compartment from which the delivery is to be made is retracted the oil will flow from that compartment through the delivery pipe conduit thereof into manifold 18 and thence through faucet 21 and the metering hose into the customer's receiving vessel by gravity. As shown in Fig. 5, the faucet 21 may be provided with a valve 50 operable to open and close said faucet and of course, while making a delivery through the metering hose, this valve 50 occupies its open position.

The valve 24 closes by gravity toward its seat 25 and in combination with the locking member 40 also serves the purpose of a stop or shut-off valve which can be positively locked in its normally closed position by means of said locking member 40. In this way the valve 24 serves a double purpose.

From the above description it will be clear that my invention provides a delivery manifold of simple and efficient construction wherein all of the parts of the multiple valve mechanism except the handle portions of the spindles 40 are housed within the manifold itself and that said valve mechanism serves the double purpose of a check valve and a stop or shut-off valve. It is also an advantage of the above construction that the number of pipe fittings and joints required is reduced to a minimum and this is an important feature in a vehicle of this class which is subjected to shocks and vibrations as it travels over the roadway.

The improvements herein described and claimed have been divided from my co-pending application for patent Serial Number 734,526, filed by me July 10, 1934, and now Patent No. 2,058,590, issued October 27, 1936.

What I claim is:

1. In a vehicle of the character described the combination with the tank body constructed interiorly with a plurality of independent compartments disposed side by side in a longitudinal row and on one level and each having an outlet at its bottom, of a plurality of independent delivery conduits each having its inlet end connected with one of said outlets; a manifold consisting of a straight elongate tubular structure extending transversely with respect to said row of compartments and disposed adjacent to the rear end thereof, said manifold having a plurality of inlet ports upon its inner side with each of which is connected the opposite delivery end of one of said delivery conduits; a separate check-and-stop valve member for controlling each inlet port adjustably mounted within said manifold and closing toward its inlet port, and a plurality of manually operable stems each associated with one of said check valves, said stems extending outwardly through and having threaded engagement with a wall of said manifold so that their inner ends are adapted for abutting engagement with their respective check valves to lock the latter on their seats, and the outer ends of all of said stems being accessible to an operator standing upon the ground back of the vehicle.

2. In a vehicle of the character described the combination with the tank body constructed interiorly with a plurality of independent compartments disposed side by side in a longitudinal row and on one level and each having an outlet at its bottom, of a plurality of independent delivery conduits each having its inlet end connected with one of said outlets; a straight manifold consisting of a straight elongate tubular structure extending transversely with respect to said row of compartments and disposed adjacent to the rear end thereof, said manifold having a plurality of inlet ports upon its inner side with each of which is connected the opposite delivery end of one of said delivery conduits; a separate check-and-stop valve member for controlling each inlet port adjustably mounted within said manifold and off-set with respect to the axis thereof so as to provide an unobstructed passageway through the manifold when said valve member occupies either its open or its closed position, said valve closing toward its inlet port, and a plurality of manually operable stems each associated with one of said check valves, said stems extending rearwardly through and having threaded engagement with a wall of said manifold so that their inner ends are adapted for abutting engagement with their respective check valves to lock the latter on their seats, and the outer ends of all of said stems being accessible to an operator standing upon the ground back of the vehicle.

3. In a vehicle of the character described, the combination with the tank body constructed interiorly with a plurality of independent compartments disposed side by side in a longitudinal row and on one level and each having an outlet at its bottom and a plurality of independent delivery conduits each having its inlet end connected with one of said outlets, of a delivery manifold consisting of a plurality of valve units and a plurality of pipe sections and extending transversely with respect to said row of compartments adjacent to the rear end thereof, each valve unit comprising a cross body formed with a valve chamber having an inlet port connected with the delivery end of one of said delivery conduits and two side ports and with a valve seat within said chamber surrounding the inner end of said inlet port, and said side ports being relatively alined at opposite sides of and perpendicularly with respect to the axis of said inlet ports and also offset laterally relatively to the latter so as to provide between them a straight unobstructed passageway through said chamber, means on said body for connecting a separate one of said pipe connections with each of said side ports, a check valve within said chamber cooperatively associated with said seat so that it is disposed outside of said passageway when occupying its closed position and also when occupying its open position, means within said chamber but outside of said passageway through which said check valve is pivotally supported by said body so as to swing bodily on an axis alongside of and parallel with said passageway thereby to control said inlet port, and a manually operable abutment spindle extending into said chamber through a hole formed in a wall of the latter opposite said inlet port and having threaded engagement with said wall so that when rotated it is moved endwise toward and from said check valve to occupy a position where it locks said check valve closed and also another retracted position where said check valve is free to swing toward and from said seat.

JOHN ANDREW JEFFERSON.